US012640797B2

(12) United States Patent　　(10) Patent No.: US 12,640,797 B2
Kela et al.　　(45) Date of Patent: May 26, 2026

(54) BEAM SELECTION IN TELECOMMUNICATION SYSTEM

(71) Applicant: Nokia Technologies Oy, Espoo (FI)

(72) Inventors: Kalle Petteri Kela, Espoo (FI); Teemu Mikael Veijalainen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/729,238

(22) PCT Filed: Jan. 27, 2023

(86) PCT No.: PCT/EP2023/052007
　　§ 371 (c)(1),
　　(2) Date: Jul. 16, 2024

(87) PCT Pub. No.: WO2023/148094
　　PCT Pub. Date: Aug. 10, 2023

(65) Prior Publication Data
　　US 2025/0096875 A1　　Mar. 20, 2025

(30) Foreign Application Priority Data
　　Feb. 3, 2022　(FI) ..................................... 20225089

(51) Int. Cl.
　　*H04L 23/02*　　(2006.01)
　　*H04B 7/06*　　(2006.01)
　　*H04B 7/08*　　(2006.01)
(52) U.S. Cl.
　　CPC ......... *H04B 7/0695* (2013.01); *H04B 7/0632* (2013.01); *H04B 7/088* (2013.01)

(58) Field of Classification Search
　　CPC ........ H04B 7/043; H04B 1/44; H04B 7/0695; H04B 7/0617; H04W 76/19; H04W 72/14; H04W 72/1284
　　USPC ................................. 375/262, 260, 299, 267
　　See application file for complete search history.

(56) References Cited

U.S. PATENT DOCUMENTS

| | | | |
|---|---|---|---|
| 11,082,115 B2 | 8/2021 | Landis et al. | |
| 2016/0285660 A1* | 9/2016 | Frenne ................. | H04B 7/0626 |
| 2018/0176801 A1 | 6/2018 | Rune | |
| 2018/0212666 A1* | 7/2018 | Kim ..................... | H04B 7/0479 |

(Continued)

FOREIGN PATENT DOCUMENTS

| | | |
|---|---|---|
| EP | 3375107 A1 | 9/2018 |
| WO | 2017/082810 A1 | 5/2017 |

(Continued)

OTHER PUBLICATIONS

Elsayed et al., "Radio Resource and Beam Management in 5G mmWave Using Clustering and Deep Reinforcement Learning", IEEE Global Communications Conference (Globecom), Dec. 7-11, 2020, 6 pages.

(Continued)

*Primary Examiner* — Khai Tran
(74) *Attorney, Agent, or Firm* — Carter, DeLuca & Farrell LLP

(57)　　ABSTRACT

A user equipment comprises: means for determining at least one preferred beam for communication between the user equipment and a network node to be used in preference to a beam measured by the user equipment to have a highest quality; and means for reporting an indication of the at least one preferred beam to the network node.

16 Claims, 6 Drawing Sheets

(56)　　　　　　References Cited

U.S. PATENT DOCUMENTS

| | | |
|---|---|---|
| 2019/0268056 A1 | 8/2019 | Wang et al. |
| 2020/0374960 A1 | 11/2020 | Deenoo et al. |
| 2021/0028828 A1 | 1/2021 | Kurras et al. |
| 2021/0289406 A1 | 9/2021 | Feki et al. |
| 2021/0328630 A1 | 10/2021 | Ryu et al. |
| 2021/0336683 A1 | 10/2021 | Pezeshki et al. |

FOREIGN PATENT DOCUMENTS

| | | |
|---|---|---|
| WO | 2020/213964 A1 | 10/2020 |
| WO | 2021/118418 A1 | 6/2021 |

OTHER PUBLICATIONS

Ali-Tolppa et al., "Mobility and QoS Prediction for Dynamic Coverage Optimization", IEEE/IFIP Network Operations and Management Symposium (NOMS), Apr. 20-24, 2020, 2 pages.

Office action received for corresponding Finnish Patent Application No. 20225089, dated Aug. 23, 2022, 10 pages.

International Search Report and Written Opinion received for corresponding Patent Cooperation Treaty Application No. PCT/EP2023/052007, dated Apr. 3, 2023, 13 pages.

\* cited by examiner

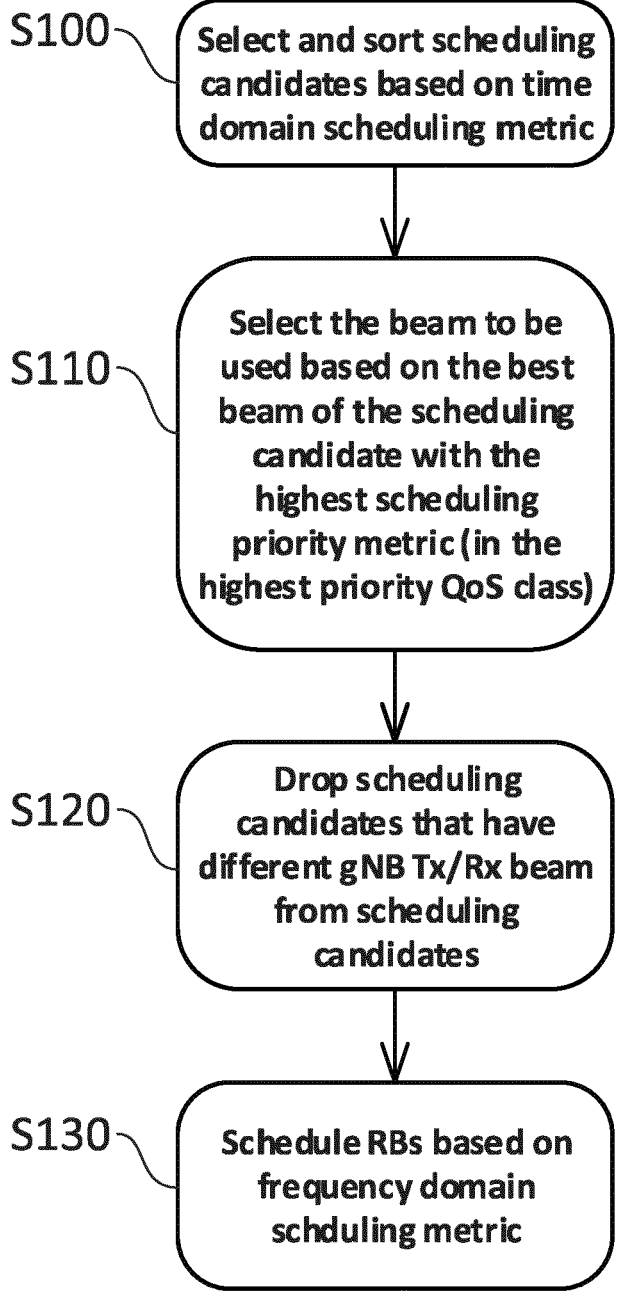

S100 — Select and sort scheduling candidates based on time domain scheduling metric S110 — Select the beam to be used based on the best beam of the scheduling candidate with the highest scheduling priority metric (in the highest priority QoS class)

S120 — Drop scheduling candidates that have different gNB Tx/Rx beam from scheduling candidates S130 — Schedule RBs based on frequency domain schduling metric

FIG. 5

BEAM SELECTION IN TELECOMMUNICATION SYSTEM

RELATED APPLICATION

This application claims priority to PCT Application No. PCT/EP2023/052007 filed Jan. 27, 2023, which claims priority benefit from FI application No. 20225089 filed Feb. 3, 2022, which is incorporated herein by reference in its entirety.

TECHNOLOGICAL FIELD

Various example embodiments relate to a user equipment, a network node and methods.

BACKGROUND

In wireless telecommunication networks, such those implementing 5th generation new radio (5G NR) and other similar networks, beam measurements and beam reporting occurs while in radio resource control (RRC) connected mode to enable suitable beams to be selected for transmissions between user equipment and network nodes. Although such beam selection can assist in communication between the user equipment and network node, unexpected consequences can occur. Accordingly, it is desired to provide an improved technique for beam selection.

BRIEF SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to various, but not necessarily all, example embodiments of the invention there is provided user equipment, comprising: means for determining at least one preferred beam for communication between the user equipment and a network node to be used in preference to a beam measured by the user equipment to have a highest quality; and means for reporting an indication of the at least one preferred beam to the network node.

The means for reporting may be configured to report the indication of the at least one preferred beam to the network node within a channel state information report. The means for reporting may be configured to report an indication of the beam to the network node within a channel state information report. The means for reporting may be configured to report an indication of a candidate set of beams to the network node within a channel state information report. The means for determining may be configured to determine the at least one preferred beam between transmission of channel state information reports.

The user equipment may comprise means for establishing the candidate set of beams based on measurements of beams received by the user equipment. The means for establishing may include beams received by the user equipment measured to exceed a quality threshold amount within the candidate set of beams. The means for establishing may include beams received by the user equipment measured to exceed a channel condition threshold amount within the candidate set of beams. The means for determining may be configured to determine the at least one preferred beam based on an indication of the at least one preferred beam received from the network node. The means for determining may be configured to determine the at least one preferred beam using a machine learning model. The machine learning model may be configured to determine the at least one preferred beam from among the candidate set of beams. The machine learning model may be configured to determine the at least one preferred beam from among the candidate set of beams by determining which of the candidate set of beams improve a performance metric. The performance metric may comprise at least one of: throughput; packet delay; reliability; and packet latency. The means for determining may be configured to measure at least one of a synchronization signal block and a channel state information reference signal to be used by the machine learning model to determine the at least one preferred beam. The means for determining may be configured to determine the at least one preferred beam using a machine learning model for each specified class of user equipment. The means for determining may be configured to determine the at least one preferred beam using a different machine learning model for each specified quality-of-service identifier of user equipment. The means for determining may be configured to determine the at least one preferred beam using a different machine learning model for one or more quality-of-service class identifiers of user equipment. The means for determining may be configured to determine the at least one preferred beam using a machine learning model for one or more quality-of-service class identifiers of user equipment and configured to fail determine the at least one preferred beam for other quality-of-service class identifiers of user equipment.

The user equipment may comprise means for receiving pre-learned model data from the network node. The pre-learned model data may comprise at least one of a Q table and neural network weights.

The user equipment may comprise means for utilizing the at least one preferred beam in preference to the beam for communication between the user equipment and the network node. The means for utilizing may be configured to schedule communication between the user equipment and the network node using the at least one preferred beam. The means for utilizing may be configured to schedule communication between the user equipment and the network node using the at least one preferred beam at least until a next channel state information reporting period. The beams may be at least one of uplink and downlink beams, or in both directions.

According to various, but not necessarily all, example embodiments of the invention there is provided a network node, comprising: means for determining at least one preferred beam for communication between user equipment and the network node to be used in preference to a beam measured by the user equipment to have a highest quality; and means for utilizing the at least one preferred beam in preference to the beam for communication between the user equipment and the network node.

The means for determining may be configured to receive an indication of the at least one preferred beam within a channel state information report from the user equipment. The means for determining may be configured to receive an indication of the beam within a channel state information report from the user equipment. The means for determining may be configured to receive an indication of a candidate set of beams within a channel state information report from the user equipment. The means for determining may be configured to establish the candidate set of beams based on measurements of beams received by the network node. The means for determining may be configured to include beams received by the network node measured to exceed a quality threshold amount within the candidate set of beams. The means for determining may be configured to include beams received by the network node measured to exceed a channel condition threshold amount within the candidate set of beams. The means for determining may be configured to determine the at least one preferred beam between transmission of channel state information reports. The means for determining may be configured to determine the at least one preferred beam based on an indication of the at least one preferred beam received from the user equipment. The means for determining may be configured to determine the at least one preferred beam using a machine learning model. The machine learning model may be configured to determine the at least one preferred beam from among the candidate set of beams. The machine learning model may be configured to determine the at least one preferred beam from among the candidate set of beams by determining which of the candidate set of beams improve a performance metric. The performance metric may comprise at least one of: throughput; packet delay; reliability; and packet latency. The machine learning model may be configured to determine the at least one preferred beam for all radio resource control connected user equipment with a cell. The means for determining may be configured to determine the at least one preferred beam using a machine learning model for each specified class of user equipment and/or for each different traffic flow. The means for determining may be configured to determine the at least one preferred beam using a different machine learning model for each specified quality-of-service identifier of user equipment. The means for determining may be configured to determine the at least one preferred beam using a different machine learning model for one or more quality-of-service class identifiers of user equipment. The means for determining may be configured to determine the at least one preferred beam using a machine learning model for one or more quality-of-service class identifiers of user equipment and configured to fail determine the at least one preferred beam for other quality-of-service class identifiers of user equipment. The machine learning model may be configured to determine the at least one preferred beam from among the candidate set of beams based on at least one of: a probability of scheduling that bearer due to quality-of-service priorities of other user equipment within that cell and their serving beams; interference by neighboring network nodes and user equipment; and combined performance of uplink and downlink with that bearer. The machine learning model may be configured to determine the at least one preferred beam from among the candidate set of beams based on measured uplink transmission from user equipment. The machine learning model may be configured to select and sort user equipment based on a time domain scheduling metric. The machine learning model may be configured to determine the at least one preferred beam from among the candidate set of beams for highest priority user equipment. The machine learning model may be configured to remove user equipment having different beams. The means for utilizing may be configured to schedule bearer resources based on a frequency domain scheduling metric. The machine learning model may be configured to determine the at least one preferred beam from among the candidate set of beams based on measured uplink transmission from user equipment. The means for determining may be configured to measure at least one of a synchronization signal block and a channel state information reference signal to be used by the machine learning model to determine the at least one preferred beam.

The network node may comprise means for transmitting pre-learned model data to the user equipment. The pre-learned model data may comprise at least one of a Q table and neural network weights. The means for utilizing may be configured to schedule communication between the user equipment and the network node using the at least one preferred beam. The means for utilizing may be configured to schedule communication between the user equipment and the network node using the at least one preferred beam at least until a next channel state information reporting period.

The beams may be at least one of uplink and downlink beams, or in both directions. The network node may comprise a base station.

According to various, but not necessarily all, example embodiments of the invention there is provided a method, comprising: determining at least one preferred beam for communication between the user equipment and a network node to be used in preference to a beam measured by the user equipment to have a highest quality; and reporting an indication of the at least one preferred beam to the network node.

The reporting may report the indication of the at least one preferred beam to the network node within a channel state information report. The reporting may report an indication of the beam to the network node within a channel state information report. The reporting may report an indication of a candidate set of beams to the network node within a channel state information report. The determining may determine the at least one preferred beam between transmission of channel state information reports.

The method may comprise establishing the candidate set of beams based on measurements of beams received by the user equipment. The establishing may include beams received by the user equipment measured to exceed a quality threshold amount within the candidate set of beams. The establishing may include beams received by the user equipment measured to exceed a channel condition threshold amount within the candidate set of beams. The determining may determine the at least one preferred beam based on an indication of the at least one preferred beam received from the network node. The determining may determine the at least one preferred beam using a machine learning model. The machine learning model may determine the at least one preferred beam from among the candidate set of beams. The machine learning model may determine the at least one preferred beam from among the candidate set of beams by determining which of the candidate set of beams improve a performance metric. The performance metric may comprise at least one of: throughput; packet delay; reliability; and packet latency. The determining may measure at least one of a synchronization signal block and a channel state information reference signal to be used by the machine learning model to determine the at least one preferred beam. The determining may determine the at least one preferred beam using a machine learning model for each specified class of user equipment and/or for each different traffic flow. The determining may determine the at least one preferred beam using a different machine learning model for each specified quality-of-service identifier of user equipment. The determining may determine the at least one preferred beam using a different machine learning model for one or more quality-of-service class identifiers of user equipment. The determining may determine the at least one preferred beam using a machine learning model for one or more quality-of-service class identifiers of user equipment and fails determine the at least one preferred beam for other quality-of-service class identifiers of user equipment.

The method may comprise receiving pre-learned model data from the network node. The pre-learned model data may comprise at least one of a Q table and neural network weights.

The method may comprise utilizing the at least one preferred beam in preference to the beam for communication between the user equipment and the network node. The utilizing may schedule communication between the user equipment and the network node using the at least one preferred beam. The utilizing may schedule communication between the user equipment and the network node using the at least one preferred beam at least until a next channel state information reporting period. The beams may be at least one of uplink and downlink beams, or in both directions.

According to various, but not necessarily all, example embodiments of the invention there is provided a method, comprising: determining at least one preferred beam for communication between user equipment and the network node to be used in preference to a beam measured by the user equipment to have a highest quality; and utilizing the at least one preferred beam in preference to the beam for communication between the user equipment and the network node.

The determining may receive an indication of the at least one preferred beam within a channel state information report from the user equipment. The determining may receive an indication of the beam within a channel state information report from the user equipment. The determining may receive an indication of a candidate set of beams within a channel state information report from the user equipment. The determining may establish the candidate set of beams based on measurements of beams received by the network node. The determining may include beams received by the network node measured to exceed a quality threshold amount within the candidate set of beams. The determining may include beams received by the network node measured to exceed a channel condition threshold amount within the candidate set of beams. The determining may determine the at least one preferred beam between transmission of channel state information reports. The determining may determine the at least one preferred beam based on an indication of the at least one preferred beam received from the user equipment. The determining may determine the at least one preferred beam using a machine learning model. The machine learning model may determine the at least one preferred beam from among the candidate set of beams. The machine learning model may determine the at least one preferred beam from among the candidate set of beams by determining which of the candidate set of beams improve a performance metric. The performance metric may comprise at least one of: throughput; packet delay; reliability; and packet latency. The machine learning model may determine the at least one preferred beam for all radio resource control connected user equipment with a cell. The determining may determine the at least one preferred beam using a machine learning model for each specified class of user equipment and/or for each different traffic flow. The determining may determine the at least one preferred beam using a different machine learning model for each specified quality-of-service identifier of user equipment. The determining may determine the at least one preferred beam using a different machine learning model for one or more quality-of-service class identifiers of user equipment. The determining may determine the at least one preferred beam using a machine learning model for one or more quality-of-service class identifiers of user equipment and fails determine the at least one preferred beam for other quality-of-service class identifiers of user equipment. The machine learning model may determine the at least one preferred beam from among the candidate set of beams based on at least one of: a probability of scheduling that bearer due to quality-of-service priorities of other user equipment within that cell and their serving beams; interference by neighboring network nodes and user equipment; and combined performance of uplink and downlink with that bearer. The machine learning model may determine the at least one preferred beam from among the candidate set of beams based on measured uplink transmission from user equipment. The machine learning model may select and sort user equipment based on a time domain scheduling metric. The machine learning model may determine the at least one preferred beam from among the candidate set of beams for highest priority user equipment. The machine learning model may remove user equipment having different beams. The utilizing may schedule bearer resources based on a frequency domain scheduling metric. The machine learning model may determine the at least one preferred beam from among the candidate set of beams based on measured uplink transmission from user equipment. The determining may measure at least one of a synchronization signal block and a channel state information reference signal to be used by the machine learning model to determine the at least one preferred beam.

The method may comprise transmitting pre-learned model data to the user equipment. The pre-learned model data may comprise at least one of a Q table and neural network weights. The utilizing may schedule communication between the user equipment and the network node using the at least one preferred beam. The utilizing may schedule communication between the user equipment and the network node using the at least one preferred beam at least until a next channel state information reporting period. The beams may be at least one of uplink and downlink beams or in both directions. The network node may comprise a base station.

According to various, but not necessarily all, example embodiments of the invention there is provided an apparatus, comprising: at least one processor; and at least one memory including computer program code; the at least one memory and the computer program code configured to, with the at least one processor, cause the apparatus at least to perform the method(s) set out above.

According to various, but not necessarily all, example embodiments of the invention there is provided a computer program comprising instructions for causing an apparatus to perform the method(s) set out above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

Figure 3:
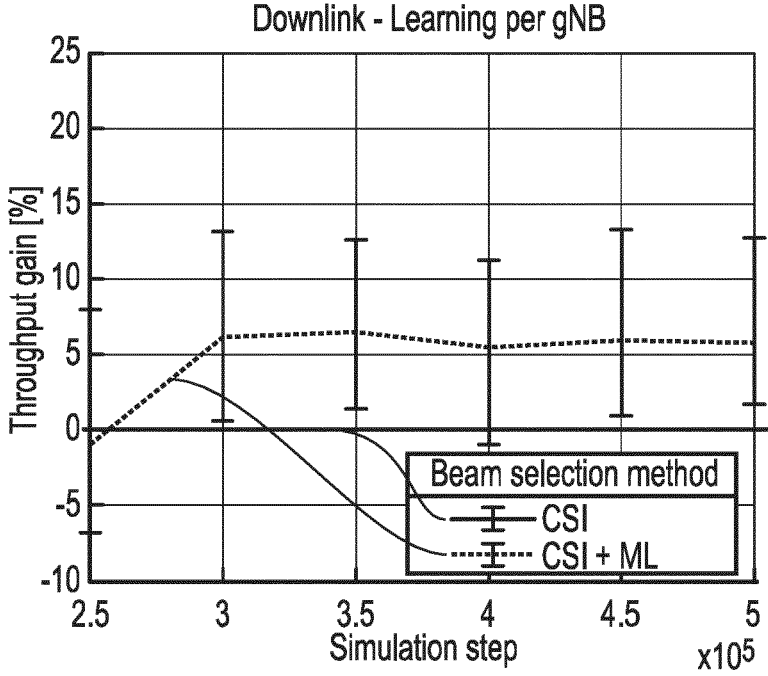
Figure 3:
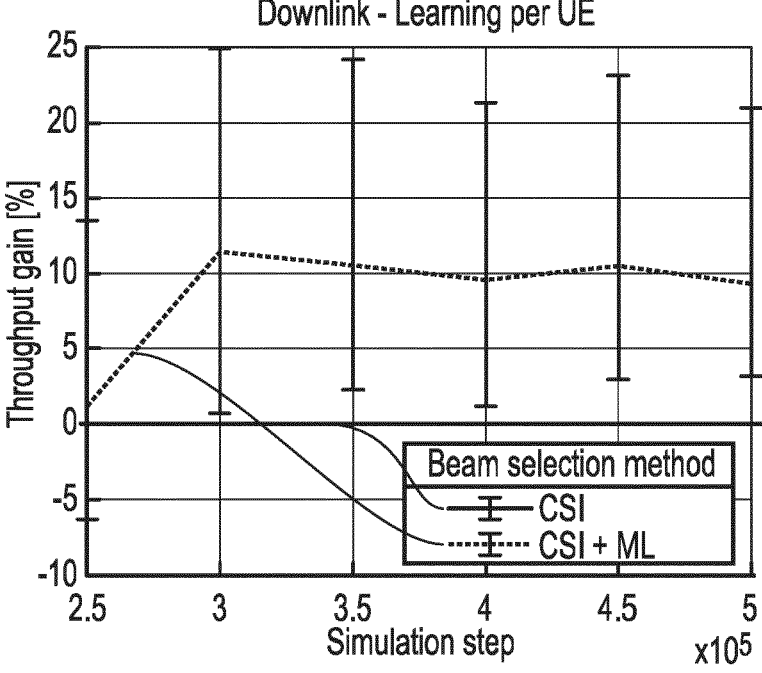
Figure 4:
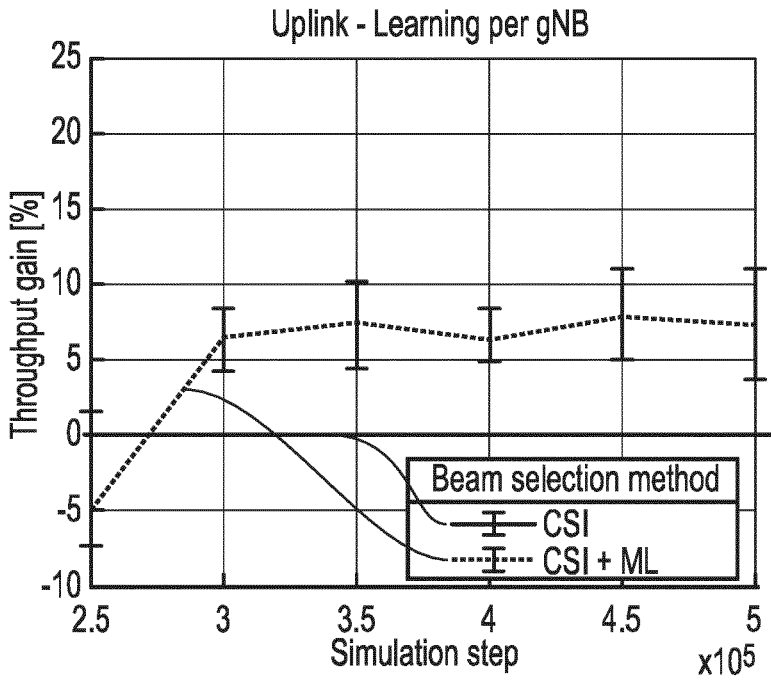
Figure 4:
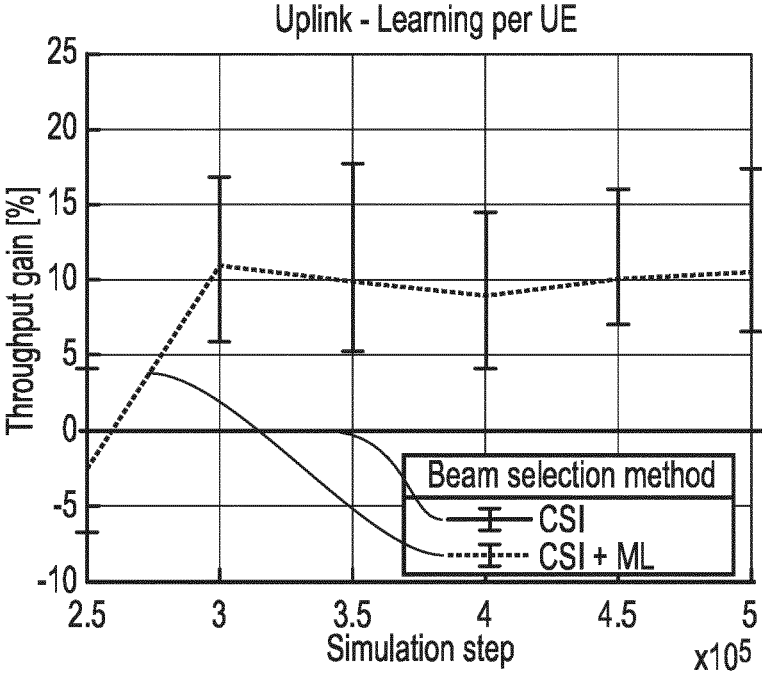

FIG. 3 and in FIG. 4 illustrate per cell throughput gains are visualized in for DL and UL respectively; and FIG. 5 illustrates an example scheduling method.

DETAILED DESCRIPTION

Before discussing the example embodiments in any more detail, first an overview will be provided. Some example embodiments provide a technique whereby a beam for use for communication between network nodes is determined in preference to a beam which has been measured in accordance with conventional techniques—this is because, as mentioned above, the beam which has been measured in accordance with conventional techniques may not be the best beam overall for communication with user equipment within a cell. The determination may be performed by a user equipment, a network node or both. Where that beam is determined by a user equipment, this is conveyed to the network node. Where that beam is determined by the network node, that beam is then used by that network node. The beam is typically conveyed in reporting information between the user equipment and network node, such as within a channel state information report or the like. One technique for determining the beam is using a machine learning model. The machine learning model may have a number of metrics which it is seeking to optimize and maximize a reward based on those metrics. Different models may be provided for different classes of user equipment and/or for different traffic flows. Q tables and/or neural network weights may be communicated from the network (for example from the base station) to the user equipment. The beam is typically used for a particular period until the beam is re-evaluated to determine whether another beam is preferable for use.

Some example embodiments relate to $5^{th}$ generation new radio (5G NR) beam measurements and beam reporting while in radio resource control (RRC) connected mode. In 5G NR, user equipment (UE) reports measurement quantities that are used by its base station (gNB) to determine the beam that is used for serving the UE. Some example embodiments relate to the utilization of machine learning. As a proof-of-concept, a model reinforcement learning method called Q-learning may be utilized. However, other models can be utilized as well. Hence, the example embodiments are not limited to Q-learning or reinforcement learning. In shown proof-of-concept studies, actions are beam selections in states where the states are beam measurement outcomes. As a cumulative reward, throughput of enhanced mobile broadband (eMBB) UEs may be utilized. Other reward functions may be used for maximization of other key performance indicators.

Conventional beam selection takes only reported (and/or measured) beam measurement quantities (e.g. signal-to-interference and noise ratio (SINR), reference signal received power (RSRP), reference signal received quality (RSRQ), or received signal strength indicator (RSSI)) into account. Hence, simply the beam that provides the best channel conditions based on selected quantity is selected for the UE. However, the gNB has to serve UEs in priority order. In particular, ultra-reliable low latency communication (URLLC) UEs typically have to be served without any delays in order to satisfy QoS requirements such as 0.99999 reliability and 1 ms latency. Therefore, gNB has to often select the beam that serves the UEs with highest QoS priority. This means that UEs with lower QoS priority such as best effort UEs might not be scheduled, because the beam selected as the best for them is not being scheduled often.

Moreover, typically mmW base stations have very limited number of radio frequency (RF) chains, which means that practical products can use often only one beam at a time. Different UEs might have different best beams based on reported measurement quantities (or based on gNB's uplink measurements on a reciprocal time division duplex (TDD) channel). Typically, 5G NR mmW base stations might have only one RF chain that limits the number of active beams to a one single beam. Therefore, if URRLC UE needs to be served frequently, eMBB UE may not getting any data through even though URLLC UE might use only a fraction of available resource blocks in frequency domain. This is because the gNB may not be using that beam if a higher QoS priority URLLC UE needs to be scheduled on another beam. Hence, some example embodiments seek to find such beams to eMBB UEs which improves their throughput without affecting to URLLC UE performance. It will be appreciated that eMBB and URLLC are just frequently used terms in order to generalize QoS classes. In 5G NR implementations, QoS Flow Identifiers (QFIs) are used to identify different QoS classes and their requirements.

In addition to spatial divergence of UEs with different QoS class data, also environmental and gNB panel orientations might cause situations where typically certain beams will not be very populated, but some other more populated beams could be used instead. Therefore, in some cases it could be beneficial to find such serving beams for each UE that they can be served as often as required. For example, there could be a situation where all URLLC UEs could be served simultaneously with a beam. If single UEs cannot utilize the full frequency domain per transmission time interval (TTI) it would be beneficial to schedule as many UEs as possible to get all frequency domain resources utilized each TTI in order to maximize instantaneous throughput and reduce latencies. This might happen if downlink/uplink (DL/UL) packets in the transmission queue does not require all resource blocks or if limited UL transmission power and antenna gain allow only limited resource block utilization per TTI.

Hence, some example embodiments provide a technique for beam selection to help increase performance (especially for discriminated UEs with lower priority QoS class), as well as to increase and equalize the performance among the UEs having similarly QoS prioritized data.

Machine learning (ML) is utilized to assist gNB transmission/reception (Tx/Rx) UL/DL beam selection for UEs with different QoS classes. In particular, some example embodiments utilize ML to learn which beam(s) could be a substitute for each reported (or measured) best or favored gNB beam (determined using conventional techniques) in order to increase e.g. throughput. Machine learning is typically utilized because it may be otherwise challenging to develop an algorithm that would take into account multiple things affecting to performance, such as: the probability of getting scheduled with a certain beam due to QoS priorities of other UEs and their serving beams; typical interference fluctuation between neighbor gNBs or other UEs cause to certain beam selection; and/or the combined performance of downlink and uplink with a selected serving beam.

Network Operation and Signaling

Figure 1:
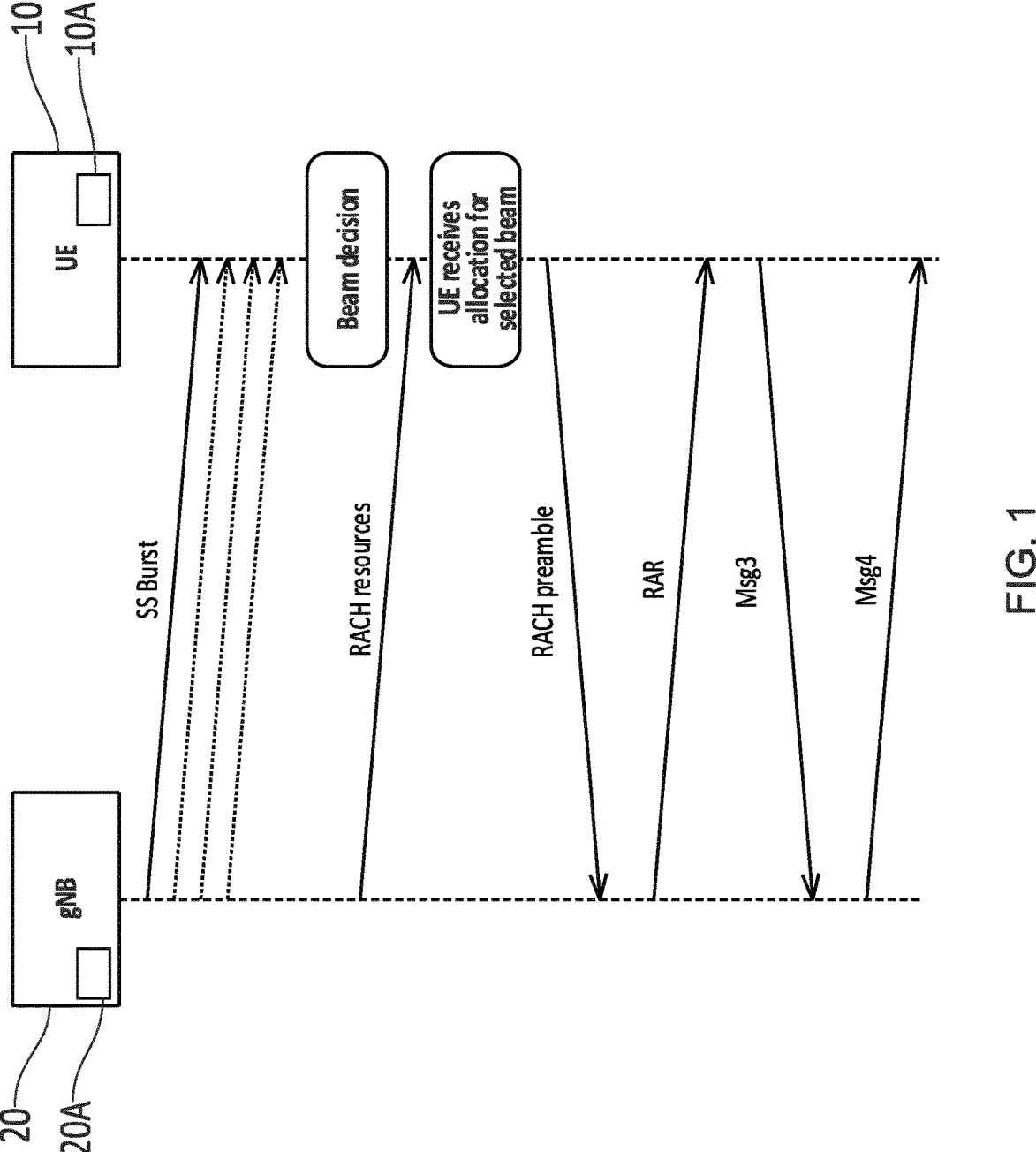
FIG. 1 illustrates an example embodiment of the subject matter described herein.
Figure 1:
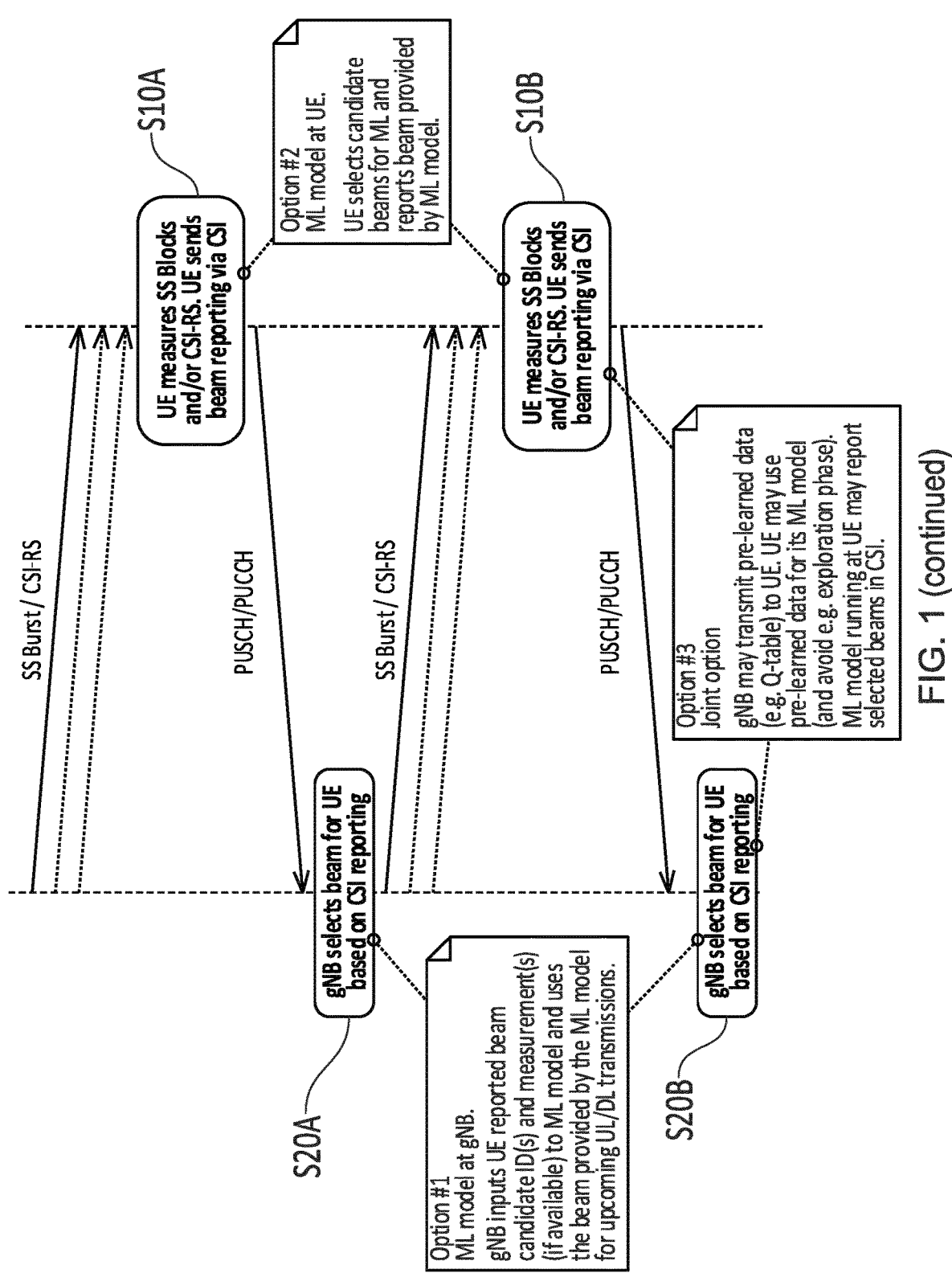

As shown in FIG. 1, some example embodiments can be implemented either: in the gNB 20 (in this option the ML model 20A is implemented at the gNB 20); in the UE 10 (in this option the ML model 10A is implemented at the UE 10); or jointly (in this option the ML model 10A; 20A can be implemented jointly (for example, the gNB's ML model 20A may provide pre-learned data (e.g. a Q-table) to the UE's ML model 10A in order to avoid exploration phase. Thus, the UE's ML model 10A may use provided data e.g. to initialize its model 10A. After that UE 10 may report beam selections provided by its ML model 10A within channel state information (CSI) reporting).

In case of gNB 20 implementation, the gNB's ML implementation tries to find alternative beams that yield higher throughput (or lower latencies or higher reliability) than the one the UE 10 reports as best based on measurement quantities. The beam candidate selection given for ML can be based on measurements. This helps to avoid zero throughput situations while exploring other than the best (based on channel measurements) beam candidates. At step S20A and S20B, the gNB 20 uses the measurements provided by the UE 10 in the CSI reporting within the gNB ML model 20A and selects the beam(s) for communication with the UE 10 based on the output of that ML model 20A.

In case of UE 10 implementation, at steps S10A and S10B, the UE 10 reports the beam index given by the ML model 10A instead or in addition to measurement based reporting. Beams given by the ML model 10A may be used instead of the best beam (based on channel measurements) in order to maximize e.g. UEs 10 throughput performance (or to minimize latency and/or packet error rate).

Some example embodiments should be agnostic to the beam measurements and reporting configuration, irrespective of whether the UE 10 reports only the beam identifier, the measurement result and beam identifier, or no beam reporting. In some example embodiments, at step S10A, S10B, the UE 10 may report the learned beam identifier(s) instead of the one(s) selected based on measurements. In some example embodiments, the UE 10 reports additionally the beam identifier(s) that were given by the machine learning model 10A. In some example embodiments, implemented at gNB 20, the machine learning model 20A may utilize the UE 10 reported best beam as an input to the ML model 20A and the ML model 20A provides the actual beam that should be used. Similarly, without beam reporting, the gNB 20 may measure the best beam from the uplink channel (while the UE 10 is transmitting reference signals) and use that as an input for the machine learning model 20A. The measured beam can be used as an input for the machine learning model 20A implemented at gNB 20.

Model Implementation

Figure 2:
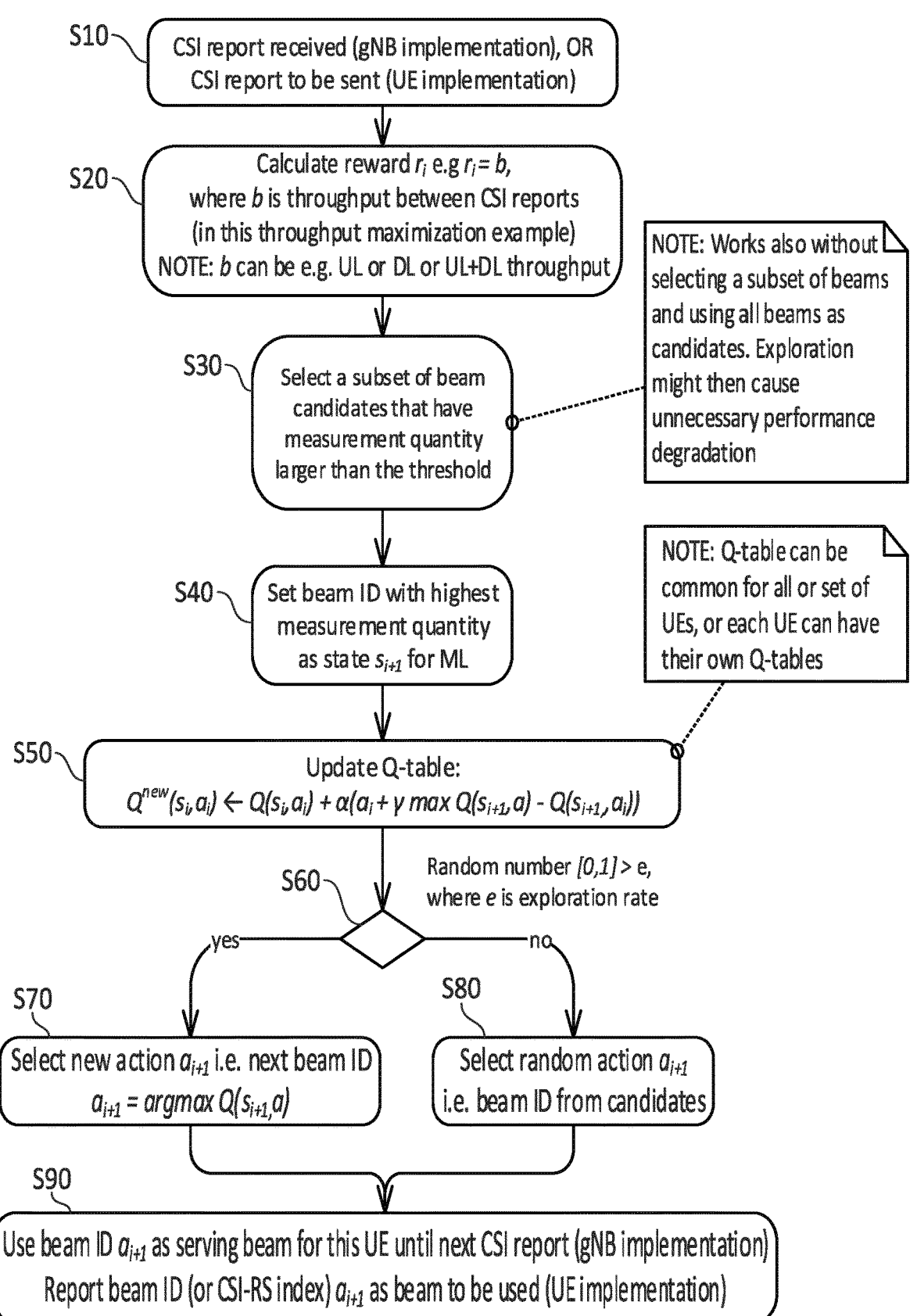
FIG. 2 illustrates an example embodiment reinforcement learning (RL) implementation of the ML models.

FIG. 2 illustrates an example embodiment reinforcement learning (RL) implementation of the ML models 10A; 20A. At step S10, the ML-assisted serving beam selection selects serving beams partially based on CSI reports. However, some example embodiments evaluate certain performance metric(s) (e.g. experienced throughput, packet delay, reliability, and/or other metrics) between each CSI report. At step S20, this performance metric is used as a reward for ML assisted beam selection. At step S30, a set of candidate beams is used as a pool of possible beams from which the ML model can select the next beam can be limited e.g. based on measured quantities such as RSRP or RSRQ. This would be possible at least in UE 10 implementation option. For example, only beams that provide signal strength over threshold may be selected as candidates. Limiting the beam pool for the ML model, in such way that all the beams can provide at least decent performance based on channel measurements, reduces performance degradation caused by the exploration (i.e. trying out different beams in this case). At step S30, the subset of beam candidate that has measurement quality larger than the threshold is set and, in S40, the beam identifier with the highest measurement quality is set and at step S50, the Q table is updated. At steps S60 to S80, beam exploration takes place and, at step S90, beam identifier selected by the ML model is used as the serving beam for that UE 10 until the next CSI report (for a gNB implementation) or is reported to the gNB 20 by the UE 10 (with our without the best beam as measured by the UE 10) as the preferred beam to be used by the gNB 20. Exploration is a typical procedure in various ML models in order to try out different actions (i.e. trying out different Tx/Rx, UL/DL beams in this case) typical for various reinforcement learning ML models.

The network may also provide different CSI parameterization for the initialization phase and for the exploitation phase. For example, a first set of parameters may have e.g. different reporting periodicity or include more information for exploration. By having momentarily more frequent reporting during the exploration, learning may be faster. After, exploration reporting could be relaxed in order to have a reduced CSI overhead. It could be also expected that, once converged, the ML model can achieve adequate performance with a more relaxed CSI reporting overhead when compared to only measurement-based CSI reporting.

Simulation Results

Accurate system-level simulations were used to provide proof-of-concept results. The simulation scenario follows 3GPP guidelines for a dense urban macro scenario, where 21 base stations (gNB 20) had 14 beams each. Simulations used 40 MHz bandwidth for both UL and UL at 30 GHz mmW FR2 band. A UE 10 moving speed of 3 km/h was assumed. In order to have realistic assumption and match with current mmW base stations in production, only a single RF chain (limiting the number of simultaneous Rx/Tx beams to a single one) was assumed. Frequency domain scheduling was performed with the UEs 10 that had the same gNB 20 Tx/Rx beam. Two types of UEs 10, URLLC and eMBB, were randomly dropped within simulation area. 378 URLLC UEs transmitted/received 50 B packets for UL/DL according to the FTP 3 traffic model with 2 ms packet inter-arrival time. 42 eMBB UEs had full buffer traffic model for both DL and UL. Scheduling in time and frequency domains was prioritizing URLLC UEs in order to minimize their latency. CSI reporting periodicity was constantly 5 ms.

The ML model 10A; 20A was used to increase eMBB UE performance while higher QoS priority URLLC UE used a conventional beam selection method. As expected, URLLC performance was not noticeably affected by ML-assisted beam selection for eMBB UEs. However, significant gain for eMBB UE performance was achieved. It was especially beneficial that worse 5-percentile eMBB UE throughput was ~3× better than with RSRP-based beam selection. In other words, ML model 10A; 20A was able to find better-performing beams especially for eMBB UEs that suffered the most from favoring higher QoS priority URLLC UEs. Per cell throughput gains are visualized in FIG. 3 and in FIG. 4 for DL and UL respectively. The first visualized simulation step (2.5×105) illustrates the average throughput gain compared to a conventional beam selection method during the whole exploration period where Q-tables are created and initialized from scratch. Naturally, some example implementations, such initialization from scratch would not be done constantly. Instead, pre-learned cell-specific Q-tables could be used. Even though in case of UE 10 implementation, the UE 10 would need to initialize a new Q-table from a scratch when connecting to a new cell, learning would pay back the initial performance degradation rather quickly. Alternatively, network may provide an initialized Q-table for a UE 10 when it is connecting to a cell.

During the exploration phase, the ML model 10A; 20A provided momentarily typically slightly worse performance than the RSRP measurement based conventional beam selection method. This performance degradation, caused by the exploration, can be controlled e.g. with (e.g. RSRP) a threshold or offset value that is used for selecting only a subset of beams as candidates. After the initial exploration period, equivalent to few seconds in real time, throughput steadily outperformed the standardized CSI report conventional beam selection method (that is RSRP measurement-based) for the rest of the simulation time.

When Q-tables were common for all UEs 10 i.e. learning per gNB 20 (only gNB implementation) within a cell, throughput gain was a bit less than when each UE 10 had their own Q-tables (UE implementation). With per UE Q-tables, UEs 10 can be shared between beams better taking individual performances into account. On the other hand, if Q-tables are common for all UEs 10, gNB implementation is simplified and gNB 20 can utilize a single existing Q-table immediately, also for all new connections instantly. Joint operation i.e. both UE and gNB implementation was not simulated due to practical simulation environment limitations.

Some example embodiments can be only implementation based, but standardization might be required if e.g. the specification desires to limit beams that can be used for exploring better-performing options. For example, in provided proof-of-concept simulations a −70 dBm RSRP limit was used for beams that were qualified as a candidate beams. This value provided low performance loss during the exploration. Another option could be for example to set a maximum dBm difference to the best measured beam.

A scheduling method used by the simulator is shown in FIG. 5. At step S100, a Time Domain Scheduler sorts scheduling candidates based on their time domain scheduling priority metric. Then, at step S110, the gNB 20 selects the beam used to Tx/Rx in the upcoming TTI based on the best beam selected for the scheduling candidate with the highest time domain priority metric. At step S120, UEs 10 that fall within different gNB Tx/Rx beams are removed from the pool of scheduling candidates. At step S130, frequency domain resource blocks are shared based on a frequency domain scheduling metric.

Some example embodiments provide an apparatus for selecting a serving beam (for UE or itself) by identifying a set of candidate beams, providing the set of candidate beams to a model selecting the serving beam, updating the model based on a compiled loss/reward function, wherein the model is used for determining the utilized serving beam. Candidate beams are typically those fulfilling certain criteria such as: being above specified RSRP (or other measurement quantity) threshold; being below specified maximum RSRP (or other measurement quantity) offset, wherein the offset is measured RSRP difference between the best beam and candidate beam. Compiling a loss/reward function based, at least in part, on achieved throughput may be performed. Compiling a loss/reward function based, at least in part, on achieved packet latency may be performed. The model may be dedicated to a certain quality-of-service (QOS) class or set of QOS classes (e.g. all best effort QoS classes that benefit from throughput maximization). Separate QoS classes or QoS class groups may use different models. The model used for determining the beam for the UE may be determined based on highest priority QoS data flows the UE is either transmitting or receiving. The same model may be used for all connected UEs within the cell with the same QoS class, or QoS class group (with similar performance targets). Different models and/or different loss/reward functions for different QoS classes may be used (for example, URLLC UEs could use a packet delay based reward, while best effort QoS class UEs could use a throughput-based reward). The gNB may utilize the beam given by the model instead of the beam with the best measurement quantity. The UEs may report (within CSI report) the best beam based on the model instead or in addition to measurement quantity based reporting. The UEs may report the set of candidate beams to the serving gNB (e.g. in bitmap format within CSI report). The gNB may provide pre-learned beam selection data to the UEs. The UEs may use the pre-learned data to setup its ML model. The pre-learned data may comprise one or more Q tables and/or neural network weights for a predetermined neural network size (for each different QoS or other class and/or for each different class of traffic flow). That pre-learned data may be provided in signaling between the network node (such as the gNB or other network node) and the UE. A first set of CSI reporting parameters may be used during the exploration. A second set of CSI reporting parameters may be used after the exploration period.

As shown in the simulation results, network performance can be improved, especially for the most discriminated best effort users. Thus, the CSI reporting overhead may be reduced, where the gNB provides pre-learned data, when UEs are running ML models, exploration periods may be reduced or completely abandoned with new users.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods or circuitry configured to perform said steps of the above-described methods.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
at least one processor; and
at least one memory including computer program code;
the at least one memory and the computer program code configured to, with the at least one processor, cause the apparatus at least to:
determine at least one preferred beam for communication between the apparatus and a network node to be used in preference to a beam measured by the apparatus to have a highest quality;
report an indication of said at least one preferred beam to said network node; and
receive pre-learned model data from said network node,
wherein said pre-learned model data comprises at least one of a Q table and neural network weights.

2. The apparatus of claim 1, wherein said reporting comprises at least one of:
report said indication of said at least one preferred beam to said network node within a channel state information report;
report an indication of said beam to said network node within a channel state information report; or
report an indication of a candidate set of beams to said network node within a channel state information report.

3. The apparatus of claim 2, wherein the apparatus is further caused to establish said candidate set of beams based on measurements of beams received by the apparatus, and wherein said establishing includes at least one of:
beams received by the apparatus measured to exceed a quality threshold amount within said candidate set of beams; or
beams received by the apparatus measured to exceed a channel condition threshold amount within said candidate set of beams.

4. The apparatus of claim 2, wherein said determining comprises determining said at least one preferred beam using a machine learning model, and wherein said machine learning model is configured to determine at least one of:
said at least one preferred beam from among said candidate set of beams; and said at least one preferred beam from among said candidate set of beams by determining which of said candidate set of beams improve a performance metric.

5. The apparatus of claim 1, wherein said determining comprises determining at least one of:
said at least one preferred beam between transmission of channel state information reports; or
said at least one preferred beam based on an indication of said at least one preferred beam received from said network node.

6. The apparatus of claim 1, wherein said determining comprises at least one of:
measure at least one of a synchronization signal block and a channel state information reference signal to be used by a machine learning model to determine said at least one preferred beam;
determine said at least one preferred beam using a machine learning model for each specified class of user equipment;
determine said at least one preferred beam using a machine learning model for each traffic flow;
determine said at least one preferred beam using a different machine learning model for each specified quality-of-service identifier of user equipment;
determine said at least one preferred beam using a different machine learning model for one or more quality-of-service class identifiers of user equipment; or
determine said at least one preferred beam using a machine learning model for one or more quality-of-service class identifiers of user equipment and configured to fail determine said at least one preferred beam for other quality-of-service class identifiers of user equipment.

7. The apparatus of claim 1, wherein the apparatus is further caused to utilize said at least one preferred beam in preference to said beam for communication between the apparatus and said network node, and said utilizing comprises scheduling at least one of:
communication between the apparatus and said network node using said at least one preferred beam; or
communication between the apparatus and said network node using said at least one preferred beam at least until a next channel state information reporting period.

8. An apparatus, comprising:
at least one processor; and
at least one memory including computer program code;
the at least one memory and the computer program code configured to, with the at least one processor, cause the apparatus at least to:
determine at least one preferred beam for communication between a user equipment and said apparatus to be used in preference to a beam measured by said user equipment to have a highest quality; and
utilize said at least one preferred beam in preference to said beam for communication between said user equipment and the apparatus,
wherein said determining comprises at least one of:
receive an indication of said at least one preferred beam within a channel state information report from said user equipment;
receive an indication of said beam within a channel state information report from said user equipment;
receive an indication of a candidate set of beams within a channel state information report from said user equipment;
establish said candidate set of beams based on measurements of beams received by the apparatus;

include beams received by the apparatus measured to exceed a quality threshold amount within said candidate set of beams;

include beams received by the apparatus measured to exceed a channel condition threshold amount within said candidate set of beams;

determine said at least one preferred beam between transmission of channel state information reports;

determine said at least one preferred beam based on an indication of said at least one preferred beam received from said user equipment; or determine said at least one preferred beam using a machine learning model.

9. The apparatus of claim 8, wherein said machine learning model is configured to perform at least one of:

determine said at least one preferred beam from among said candidate set of beams;

determine said at least one preferred beam from among said candidate set of beams by determining which of said candidate set of beams improve a performance metric;

determine said at least one preferred beam for all radio resource control connected user equipment with a cell;

determine said at least one preferred beam using a machine learning model for each specified class of user equipment;

determine said at least one preferred beam using a machine learning model for each traffic flow;

determine said at least one preferred beam using a different machine learning model for each specified quality-of-service identifier of user equipment;

determine said at least one preferred beam using a different machine learning model for one or more quality-of-service class identifiers of user equipment; or determine said at least one preferred beam using a machine learning model for one or more quality-of-service class identifiers of user equipment and configured to fail determine said at least one preferred beam for other quality-of-service class identifiers of user equipment.

10. The apparatus of claim 9, wherein said determining of the at least one preferred beam from among said candidate set of beams is based on at least one of:

a probability of scheduling that bearer due to quality-of-service priorities of other user equipment within that cell and their serving beams;

interference by neighboring network nodes and user equipment; and combined performance of uplink and downlink with that bearer;

determine said at least one preferred beam from among said candidate set of beams based on measured uplink transmission from user equipment;

select and sort user equipment based on a time domain scheduling metric;

determine said at least one preferred beam from among said candidate set of beams for highest priority user equipment;

remove user equipment having different beams;

determine said at least one preferred beam from among said candidate set of beams based on measured uplink transmission from user equipment; or measure at least one of a synchronization signal block and a channel state information reference signal to be used by the machine learning model to determine said at least one preferred beam.

11. The apparatus of claim 8, wherein said utilizing comprises at least one of:

schedule communication between said user equipment and the apparatus using said at least one preferred beam; and schedule communication between said user equipment and the apparatus using said at least one preferred beam at least until a next channel state information reporting period.

12. A method, comprising:

determining, by a user equipment, at least one preferred beam for communication between said user equipment and a network node to be used in preference to a beam measured by said user equipment to have a highest quality;

reporting an indication of said at least one preferred beam to said network node; and utilizing said at least one preferred beam in preference to said beam for communication between said user equipment and said network node, and said utilizing comprises scheduling at least one of:

communication between said user equipment and said network node using said at least one preferred beam; or communication between said user equipment and said network node using said at least one preferred beam at least until a next channel state information reporting period.

13. The method of claim 12, wherein said reporting comprises at least one of:

report said indication of said at least one preferred beam to said network node within a channel state information report;

report an indication of said beam to said network node within a channel state information report; or report an indication of a candidate set of beams to said network node within a channel state information report.

14. The method of claim 13, wherein said determining comprises determining said at least one preferred beam using a machine learning model, and wherein said machine learning model is configured to determine at least one of:

said at least one preferred beam from among said candidate set of beams; and said at least one preferred beam from among said candidate set of beams by determining which of said candidate set of beams improve a performance metric.

15. The method of claim 12, wherein said determining comprises determining at least one of:

said at least one preferred beam between transmission of channel state information reports; or said at least one preferred beam based on an indication of said at least one preferred beam received from said network node.

16. The method of claim 12, wherein said determining comprises at least one of:

measure at least one of a synchronization signal block and a channel state information reference signal to be used by a machine learning model to determine said at least one preferred beam;

determine said at least one preferred beam using a machine learning model for each specified class of user equipment;

determine said at least one preferred beam using a machine learning model for each traffic flow;

determine said at least one preferred beam using a different machine learning model for each specified quality-of-service identifier of user equipment;

determine said at least one preferred beam using a different machine learning model for one or more quality-of-service class identifiers of user equipment; or determine said at least one preferred beam using a machine learning model for one or more quality-of-service class identifiers of user equipment and configured to fail determine said at least one preferred beam for other quality-of-service class identifiers of user equipment.

* * * * *